United States Patent [19]

Weinberg et al.

[11] 4,361,694

[45] Nov. 30, 1982

[54] COORDINATION COMPLEXES AS POLYESTERIFICATION CATALYSTS

[75] Inventors: Kurt Weinberg, Upper Saddle River, N.J.; Gordon C. Johnson, Armonk, N.Y.

[73] Assignee: Union Carbide Corporation, Danbury, Conn.

[21] Appl. No.: 336,317

[22] Filed: Dec. 31, 1981

[51] Int. Cl.³ ............................................ C08G 63/34
[52] U.S. Cl. .................................. 528/279; 528/281; 528/283; 528/285
[58] Field of Search ................ 528/279, 281, 283, 285

[56] References Cited

U.S. PATENT DOCUMENTS

| | | | |
|---|---|---|---|
| Re. 30554 | 3/1981 | Weinberg et al. | 528/281 X |
| 3,546,179 | 12/1970 | Koller | 528/286 X |
| 3,852,247 | 12/1974 | Vizurraga | 528/283 X |
| 4,116,942 | 9/1978 | Weinberg et al. | 528/283 |
| 4,143,057 | 3/1979 | Weinberg et al. | 528/281 X |

*Primary Examiner*—Lucille M. Phynes
*Attorney, Agent, or Firm*—Gary L. Wamer

[57] ABSTRACT

The process and the catalyst used therein for producing polyesters and copolyesters, useful for making films and fibers, by the polycondensation of dicarboxylic acids and aliphatic glycols using coordinations complexes of metal halides and silicon compounds as catalysts.

17 Claims, No Drawings

COORDINATION COMPLEXES AS POLYESTERIFICATION CATALYSTS

In the production of polyesters and copolyesters the reaction is generally considered a dual or two stage reaction. In the first stage esterification or transesterification occurs and in the second stage polycondensation occurs as follows:

I TRANSESTERIFICATION

FROM DIMETHYL TEREPHTHALATE (DMT):

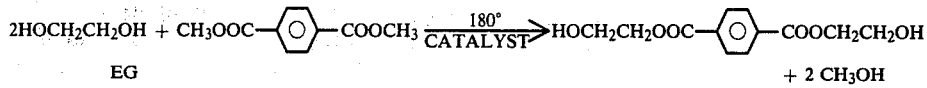

FROM TEREPHTHALIC ACID (TPA):

II POLYCONDENSATION

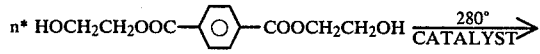

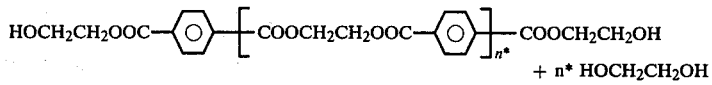

*n = about 90 to 100 in many instances.

BACKGROUND OF THE INVENTION

The production of polyesters and copolyesters of dicarboxylic acids and aliphatic glycols has been carried out commercially for many decades. Among the earliest disclosures relating to the production of polyesters and copolyesters is the disclosure in U.S. Pat. No. 2,465,319, issued Mar. 22, 1949. Since this disclosure many variations have been made in the process and many catalysts have been discovered and patented. On Dec. 8, 1970, there issued U.S. Pat. No. 3,546,179, which is directed to the use of compounds containing both silicon and phosphorus atoms a compounds as a catalyst for the production of such polyesters and copolyesters.

The use of metal halides and certain silicon compounds as catalysts in the polycondensation of dicarboxylic acids and aliphatic glycols is disclosed in U.S. Pat. Nos. 4,143,057; 4,254,241; and Re-30,554. The metal halides employed in the examples therein are necessarily employed with solvent present. In addition these compounds tend to be hydrolytically unstable and, thus, require careful handling during their use. Thus, although these catalysts are highly advantageous it would be highly desirable to have a catalyst that may be of use without a solvent and which is hydrolytically stable.

SUMMARY OF THE INVENTION

It has now been found that coordination complexes of a metal alkoxyhalide and a silicon compound, as hereinafter defined, are excellent polyesterification catalyst complexes for the production of polyesters and copolyesters useful for making films, fibers and other shaped articles.

DESCRIPTION OF THE INVENTION

This invention is concerned with novel polyesterification catalyst compositions and processes for producing polyesters using such catalyst compositions.

The novel catalyst compositions of this invention are coordination complexes of (A) a metal alkoxy halide and (B) a silicon compound, as hereinafter more fully defined. The use of these catalyst complexes or compositions results in the elimination of the use of a solvent for the catalyst, provides a less moisture sensitive, more hydrolytically stable catalyst and results in the production of polyesters and copolyesters of high degrees of polycondensation that are characterized by high melting point, high elongation at break, good tensile strength and good stability to heat and light.

The first stage esterification or transesterification reaction is carried out in the traditional manner by heating the mixture at between about 150° C. and about 270° C., preferably between about 175° C. and about 250° C. During this stage any of the well-known esterification or transesterification catalysts can be used, illustrative thereof one can mention zinc acetate, manganese acetate, cobalt (I) acetate, zinc succinate, zinc borate, magnesium methoxide, sodium methoxide, cadmium formate, and the like. The concentration thereof is that conventionally used, namely between about 0.001 and about one percent by weight, based on the weight of dicarboxylic acid compound charged. It is preferably between about 0.005 and about 0.5 percent by weight and more preferably between about 0.01 and about 0.2 percent by weight.

In the second stage, or the polycondensation, the coordination complex catalysts of this invention are useful. These novel coordination complex catalysts comprise two essential components. The first component is a metal alkoxy halide and the second component is one or more of the hereinafter defined silicon compounds.

The metal alkoxyhalide used to produce the coordination complexes useful as catalysts are the alkoxy halides of the metals titanium, zirconium, zinc, germanium, tin, lead, antimony and bismuth; preferably titanium, germanium and antimony; and most preferably titanium. The metal alkoxy halides useful as catalysts are of the general formula:

$$M(OR)_a X_b$$

wherein M is the metal and is at least one of titanium, zirconium, zinc, germanium, tin, lead, antimony and bismuth; R is alkyl, aryl, alkylaryl, arylalkyl or haloalkyl having between 1 and about 20 carbon atoms, preferably having between 1 and about 4 carbon atoms; a is an integer having a value of from 1 to 3; the sum (a+b) is equal to or less than 4; and X is at least one of F*, Cl, Br or I with the proviso that when M is antimony a is an integer having a value of from 1 to 4 and the sum (a+b) is equal to or less than 5. Illustrative of suitable metal alkoxy halides one can include the mono-, di-, and tri-alkoxy bromides, alkoxy chlorides, alkoxy fluorides and alkoxy iodides of titanium and zirconium; the mono- and di- alkoxy bromides, alkoxy chlorides, alkoxy fluorides and alkoxy iodides of zinc, germanium, tin, antimony, bismuth and lead including the mixed bromide-chlorides, bromide-iodides and chloride-iodides of tin. The preferred metal alkoxy halides are the haloalkoxy titanates. These metal halides are well known to the average chemist and are fully enumerated in chemical handbooks to the extent that specific naming thereof is not necessary herein to enable one skilled in the art to know chemical names of the specific metal alkoxyhalides per se; see the *The Organic Chemistry of Titanium*, Feld and Cowe, Butterworth & Co., Ltd. (1965).

*It has been observed that care must be taken in the preparation of fluorine-containing metal alkoxy halides since under some conditions such compounds may react explosively with impurities or other compounds present.

In producing the coordination complexes useful as catalysts, the molar ratio of metal alkoxy halides to silicon compound in the coordination complex can vary between about 2:1 and about 1:10; preferably between about 1:1 and about 1:7, and most preferably between about 1:1 and about 1:2.

In the polycondensation reaction the coordination catalyst complex is preferably used in an amount of between about 0.01 and about 0.2 weight percent, or higher, based on the weight of dicarboxylic acid compound charged, more preferably 0.01 to 0.06 weight percent. Although any catalytically effective amount can be employed. As used in this application the term "dicarboxylic acid compound" means both the free dicarboxylic acids and the esters thereof.

The dicarboxylic acid compounds used in the production of polyesters and copolyesters are well known to those skilled in the art and illustratively include terephthalic acid, isoterephthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkyl esters thereof that contain from 1 to about 5 carbon atoms in the alkyl groups thereof.

Suitable aliphatic glycols for the production of polyesters and copolyesters are the acyclic and alicyclic aliphatic glycols having between about 2 and 10 carbon atoms, especially those represented by the general formula $HO(CH_2)_p OH$, wherein p is an integer having a value of between about 2 and about 10, such as ethylene glycol, trimethylene glycol, tetramethylene glycol, pentamethylene glycol, decamethylene glycol, and the like.

Other known suitable aliphatic glycols include 1,4-cyclohexanedimethanol, 3-ethyl-1,5-pentanediol, 2,2,4,4,-tetramethyl-1,3-cyclobutanediol, and the like. One can also have present a hydroxylcarboxyl compound such as 4-hydroxybenzoic acid, 4-hydroxyethoxybenzoic acid, or any of the other hydroxylcarboxyl compounds known as useful to those skilled in the art.

It is also known that mixtures of the above dicarboxylic acid compounds or aliphatic glycols can be used and that a minor amount of the dicarboxylic acid component, generally up to about 10 mole percent, can be replaced by other acids or modifiers such as adipic acid, sebacic acid, or the esters thereof, or with a modifier that imparts improved dyeability to the polymers. In addition one can also include pigments, delusterants or optical brighteners by the known procedures and in the known amounts.

The polycondensation reaction is generally carried out at a temperature between about 225° C. and about 325° C., preferably between about 250° C. and about 290° C. at reduced pressure and under an inert atmosphere. These traditional reaction conditions for the polycondensation reaction are well known to those skilled in the art.

The silicon compounds that are used in conjunction with the metal alkoxyhalide to produce the coordination complex catalyst of this invention are represented by the following generic formulas:

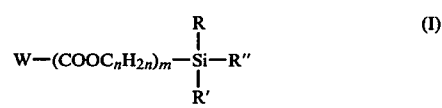  (I)

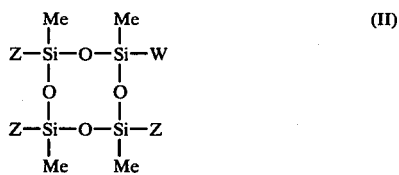  (II)

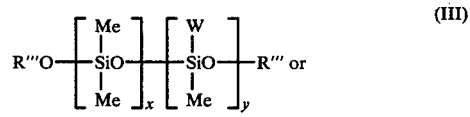  (III)

$$OCH_2CH_2SiR_3^{**} \quad (IV)$$

wherein
W is $CH_2=CX-$ or

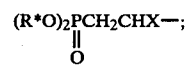

X is hydrogen or methyl and is methyl only when m is one;

R* is alkyl or haloalkyl having from 1 to 4 carbon atoms;

R** is methyl, ethyl, butyl, acetoxy, methoxy, ethoxy or butoxy;

R is methyl, ethyl, butyl, methoxy, ethoxy, butoxy, or trimethysiloxy;

R' is methyl, methoxy, ethoxy, butoxy or trimethylsiloxy;

R" is methoxy, ethoxy, butoxy, trimethylsiloxy or vinyldimethylsiloxy;

R''' is methyl, ethyl, butyl or trimethylsilyl;

Me is methyl;

Z is methyl or W;

Q is an NCCH$_2$—, NH$_2$CH$_2$NHCH$_2$—, NC—HS— or HSCH$_2$CH$_2$S— group;
n is an integer having a value of from 2 to 5;
m is an integer having a value of zero or one;
x is an integer having a value of from 1 to 100; and
y is an integer having a value of from 1 to 100.

Subgeneric to the silicon compounds represented by formula (I) are the compounds represented by the following subgeneric formulas:

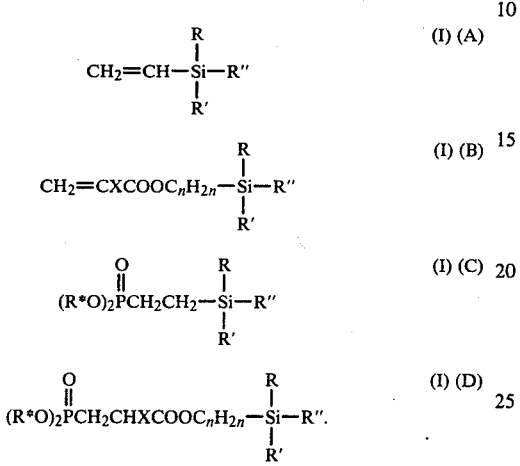

Subgeneric to the silicon compounds represented by formula (II) are the compounds represented by the following subgeneric formulas:

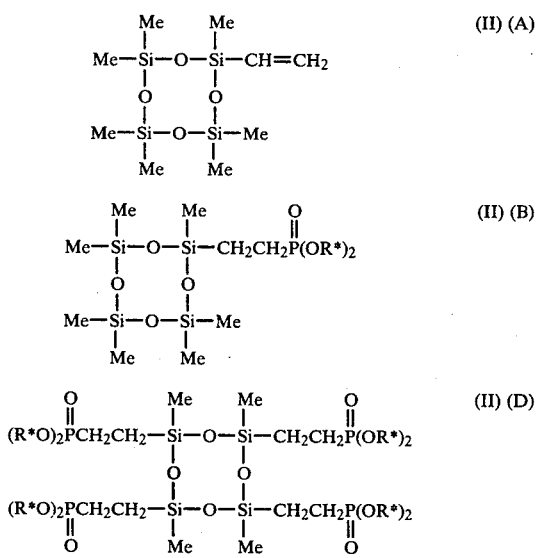

Illustrative of the silicon compounds which may be employed in forming the polycondensation catalyst of the invention are the following:
beta-cyanoethyl triethoxysilane,
gamma-mercaptopropyl triethoxy- silane, gamma-aminopropyl triethoxysilane, diethoxyphosphorylethyl methyl diethoxysilane, vinyl triethoxysilane, vinyl trimethoxysilane, vinyl triacetoxysilane, gamma-methacryloxypropyl trimethoxysilane, diethoxyphosphorylethyl heptamethyl cyclotetrasiloxane, trimethyl silyl terminated copolymer having dimethoxysiloxy and methylvinylsiloxy units in the molecule, beta-cyanoethyl trimethylsilane, gamma-(2-aminopropyl) triethoxysilane, S-beta(2-mercaptoethyl) mercaptoethyl triethoxysilane, beta-mercaptoethyl, vinyl methyl diethoxysilane, vinyl methyl di(trimethylsiloxy)silane, tetramethyl divinyl disiloxane, heptamethyl vinyl cyclotetrasiloxane, 1,3,5,7-tetramethyl 1,3,5,7-tetravinyl cyclotetra- siloxane, diethoxyphosphorylethyl methyl diethoxy- silane, diethoxyphosphorylisopropyl triethoxysilane, diethoxyphosphorylethyl methyl di(trimethylsiloxy)-silane, heptamethyl diethoxyphosphorylethyl cyclotetrasiloxane, 1,3,5,7-tetramethyl 1,3,5,7-tetra(diethoxyphosphorylethyl)cyclotetrasiloxane, 1,1,3,3-tetramethyl-1,3-di(-diethoxyphosphorylethyl)disiloxane.

In a typical polycondensation reaction, the prescribed amounts of dicarboxylic acid compounds, diols, and catalysts are charged to the reactor. The reaction mixture is then heated under an inert gas atmosphere at a temperature of between about 180° C. and about 210° C. to effect the initial esterification or transesterification. Thereafter, a substantial amount of the glycol is removed and the transesterification is completed by heating the reaction mixture at a temperature of from about 225° C. to about 235° C. The second stage polycondensation reaction is then carried out by heating the reaction mixture at a temperature of from about 225° C. to about 325° C. under a reduced pressure of from about 0.1 mm. to about 20 mm. of mercury, preferably below about 1 mm. The use of the catalyst complexes or mixtures of this invention has often resulted in shorter overall reaction periods, decreased formation of glycol dimer, e.g. diethylene glycol, and resulted in the absence of a solvent for the catalyst.

EXPERIMENTAL PROCEDURE

The following examples were carried out by preparing the haloalkoxy titanate by preparing a solution of the alkoxy titanate or haloalkoxy titanate and an acetyl halide (acetylchloride and acetyl bromide were employed) into a reaction flask (as a standard 3 neck-round bottom flask) equipped with a mechanical stirrer condenser and dropping funnel. The acetyl halide was slowly added to the titanate. The mixture was refluxed for about 2 to 2½ hours in an oil bath at a temperature of about 70° C. and 80° C. The resulting mixture was distilled under vacuum with fractions being analyzed as set forth in the following examples.

The titanium alkoxyhalides formed above was then reacted with a silicon compound, as hereinbefore described and as set forth in the examples. The resulting mixture, i.e., the polycondensation catalyst, was analyzed by microanalysis.

The polycondensation catalyst was then employed as a polycondensation catalyst by mixing with dimethyl terephthalate (736 grams) ethylene glycol (542 grams) and manganese acetate (0.222 grams). The transesterification reaction was carried out by heating the mixture to about 178° C. to about 190° C. for a period of time (about 3 hours) under an argon atmosphere with methanol being distilled from the reaction mixture. The temperature was then raised to about 230° C. and maintained for about one hour to complete the transesterification step. The temperature was then raised to about 280° C. and the pressure was reduced to below about 1 millimeter of mercury and the polycondensation process was carried out. During the polycondensation reaction the mixture was stirred with a mechanical stirrer and a small amount of a stabilizer was added when the mixture was at a temperature of about 250° C. and at 5 millimeters of mercury. The amount of stabilizer employed in each example was 0.325 grams. The polycondensation reaction was terminated when the intrinsic viscosity was 0.57, a typical value for a commercially acceptable polyester, and the time required to obtain this intrinsic viscosity was recorded as the polycondensation time (the time from reaching 1 mm mercury pressure to when the polyester has an intrinsic viscosity was 0.57). The intrinsic viscosity determinations were made by preparing a solution of 0.5 weight percent of polyester in o-chlorophenol and measuring its viscosity at 25° C. in an Ubbelohde viscometer.

The whiteness of the polyester was measured by use of a Hunterlab Tristimulus (x,y,z) Colorimeter D-25 which uses filters that approximate spectrally the standard observer functions of the eye and measure color in terms of the parameters x,y,z which are obtained from the Hunterlab Tristimulus (x,y,z) Colorimeter. The b value is an indication of the yellowness or whiteness of the polyester and is determined by the equation:

$$b = \frac{7.0 \, (y - 0.847z)}{\sqrt{y}}$$

The lower the value of b the less yellow is the polyester. The measurement of b is made using a 2 inch square block of polyester resin after the polyester resin has been polished. A positive b value indicates that some yellow exists while a negative b value indicates some blue exists.

STABILIZER

The stabilizer employed in the polycondensation reaction is present to improve the color properties of the polyester product.

The stabilizer was prepared by charging 57 grams (0.0648) mole) of ethyl acetate (solvent), 54.9 grams of superphosphoric acid (105%), 18.0 grams (0.170) mole) of diethylene glycol and 330 grams (5.4 mole) of propylene oxide into a 3-neck round bottom flask equipped with a mechanical stirrer and a condenser. The superphosphoric acid was added first with ethyl acetate and diethylene glycol then being added. The reaction mixture was cooled to about 20° C. and the propylene oxide was added dropwise under an argon atmosphere while the reaction mixture was stirred and cooled by an ice bath. The temperature of the reaction mixture was kept at between about 30° and 40° C. during the addition of the propylene oxide which addition took about two hours.

The reaction mixture was refluxed for 2 hours at about 44° C. and subsequently stripped in vacuum of excess propylene oxide to give 265 grams of the stabilizer product having 6.26 weight percent phosphorus and characterized by an infrared spectrum having strong bands at 3400 cm$^{-1}$, 1737 cm$^{-1}$, 1455 cm$^{-1}$, 1375 cm$^{-1}$ and 1260 cm$^{-1}$.

EXAMPLE 1

The coordination complex component monochloro tri(isopropoxy)titanate was produced by preparing a mixture of 65.0 grams of tetra isopropyl titanate and 18.0 grams of acetyl chloride in a reaction flask (a standard 3 neck-round bottom flask) equipped with a mechanical stirrer, condenser and dropping funnel. The acetyl chloride was slowly added to the tetra isopropyl titanate to prepare the solution. The mixture was refluxed for 2½ hours in an oil bath at about 70° to 80° C. and then distilled in vacuo. Microanalysis of the fraction distilling at about 135° C. to 140° C. (18 mm Hg) showed 40.19 wt. percent carbon; 8.13 wt. percent hydrogen; and 14.19 wt. percent chlorine.

The above product (26.3 grams) was mixed with 34.0 g of di(isopropoxy)phosphoryl ethyl methyl diethoxysilane. An exothermic reaction occured and a yellow oil solution was observed.

The resulting catalyst was used in the preparation of polyester, as above described, which had a molecular weight of 17,800 and a b-value of 7.4.

EXAMPLE 2

The coordinate complex component monobromo tri(isopoxy)titanate was produced by preparing a solution of 34.8 grams (0.122 mole) of tetra isopropyl titanate and 14.8 grams (0.122 mole) of acetyl chloride in a reaction flask (a standard 3 neck-round bottom flask) equipped with a mechanical stirrer, condenser and dropping funnel. The acetyl chloride was slowly added to the tetra isopropyl titanate to prepare the solution. The mixture was refluxed for 2½ hours in an oil bath at about 70° to 80° C. and then distilled in vacuo.

Microanalysis of the fraction collected at 70°–80° C.,/0.5 millimeter of mercury showed 34.15 wt. percent carbon; 6.74 wt. percent hydrogen; and 27.53 wt. percent bromine.

The above fraction was mixed with an equal molar amount of di(isopropoxy)phosporyl ethyl methyl diethoxysilane. An exothermic reaction occurred and a yellow oil solution as observed.

This polycondensation catalyst was used to produce a white polyester as above described having a molecular weight of about 17,410 and a b-value of 5.99.

EXAMPLE 3

The coordination complex component dichloro di(isopropyl)titanate was produced by preparing a solution of 521 grams (2.0 mole) of monochloro tri(isopropoxy)titanate prepared in Example 1 and 157 grams (2.0 mole) of acetyl chloride in a reaction flask (a standard 3 neck-round bottom flask) equipped with a mechanical stirrer, condenser and dropping funnel. The acetyl chloride was slowly added to the monochloro tri(isopropery)titanate to prepare the solution. The mixture was refluxed for 2 hours in a oil bath at about 70° to 80° C. Microanalysis of the product fraction collected at 95°–98° C. and 1.0 millimeter of mercury and showed 30.34 wt. percent carbon; 6.30 wt. percent hydrogen; and 28.48 wt. percent chlorine.

The above product, 0.8 moles (189.0 grams) of dichloro di(isopropoxy)titanate, was added to 261 grams (0.8 mole) of di(isopropoxy) phosphoryl ethyl methyl diethoxysilane. A exothermic reaction occurred and an orange oil solution was observed.

The resulting catalyst was used to produce a polyester which had a molecular weight of about 17,000 and a b value of 4.3.

EXAMPLE 4

A polycondensation catalyst was prepared according to the invention by mixing equimolar amounts of monochloro tributoxy titanate and di(methoxy)phosphoryl ethylmethyl diethoxysilane in an erlenmeyer flask. The product was a yellow oil.

The resulting catalyst was used to prepare a polyester which had a molecular weight of 24,500 and a b-value of 6.5.

EXAMPLE 5

The coordination complex component monobromo tri(butoxy)titanate was produced by preparing a mixture of 85 grams (0.25 mole) of tetrabutyl titanate and 30.74 grams (0.25 mole) of acetyl bromide in a reaction flask (a standard 3 neck-round bottom flask) equipped with a mechanical stirrer, condenser and dropping funnel. The acetyl bromide was slowly added to the tetra butyl titanate to prepare the mixture. The mixture was refluxed for 2½ hours in an oil bath and at about 70° to 80° C. and subsequently distilled in vacuo. Microanalysis of the fraction collected at 142°-152° C.; and 0.35 millimeters of mercury showed 41.38 wt. percent carbon; 8.02 wt. percent hydrogen; 22.20 wt. percent bromine.

The product fraction, above, was mixed with an equal molar amount of di(methoxy)phosphoryl ethyl methyl diethoxysilane. A exothermic reaction occurred and a yellow oil solution was observed.

The resulting catalyst was used in the preparation of a polyester which had a molecular weight of 20,274 and a b value of 5.1.

EXAMPLE 6

The coordination complex component trichloro butoxy titanate was produced by preparing a mixture of 95.0 grams (0.5 mole) of titanium tetrachloride and 37.0 grams (0.5 mole) of butanol in a reaction flask (a standard 250 milliliter 3 neck-round bottom flask) equipped with a mechanical stirrer, condenser and dropping funnel. The titanium tetrachloride was slowly added to the butanol. An ice bath was used to maintain the reaction temperature under control owing to the exothermic nature of the reaction. A yellow solution was observed which upon standing produced a white crystalline product. Microanalysis of the product after washing with hexane and drying in vacuo showed 21.77 wt. percent carbon; 4.62 wt. percent hydrogen; 45.30 wt. percent chlorine.

A portion of the above product (1.17 grams; 0.00515 mole) was mixed with an equal molar amount of di(isopropoxy)phosphoryl ethyl methyl diethoxysilane (1.678 grams; 0.00515 mole). A yellow oil was observed as the product.

The resulting catalyst was used in the preparation of a polyester which had a molecular weight of 19,450 and a b-value of 3.4.

We claim:

1. In a process for the manufacture of solid fiber-forming polyesters or copolyesters of dicarboxylic acid compounds and aliphatic glycols in the presence of catalysts, the improvement which comprises using as a polyesterification catalyst a coordination complex of (A) and (B), wherein:

(A) is a metal alkoxy halide selected from the group consisting of $$M(OR)_a X_b$$

wherein M is at least one of titanium, zinc, germanium, tin, lead, antimony and; R is alkyl, aryl, alkylaryl, arylalkyl, haloalkyl having from 1 to 20 carbon atoms; a and b are integers having a value of from 1 to 3; the sum of $(a+b)$ is equal to or less than the integer 4; x is at least one of F, Cl, Br or I; with the proviso that when M is antimony a is an integer having a value of from 1 to 4 and the sum $(a+b)$ is equal to or less than 5;

(B) is a silicon compound selected from the group consisting of:

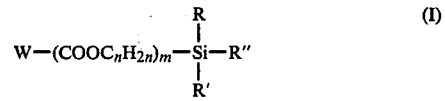 (I)

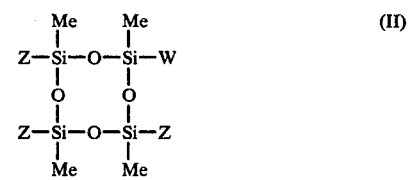 (II)

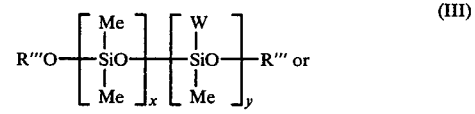 (III)

$OCH_2CH_2SiR_3^{**}$ (IV)

wherein
W is $CH_2{=}CX{-}$ or

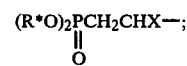

X is hydrogen or methyl and is methyl only when m is one;
R* is alkyl or haloalkyl having from 1 to 4 carbon atoms;
R** is is methyl, ethyl, butyl, acetoxy, methoxy, ethoxy or butoxy;
R is methyl, ethyl, butyl, methoxy, ethoxy, butoxy, or trimethylsiloxy;
R' is methyl, methoxy, ethoxy, butoxy or trimethylsiloxy;
R" is methoxy, ethoxy, butoxy, trimethylsiloxy or vinyldimethylsiloxy;
R'" is methyl, ethyl, butyl or trimethylsilyl;
Me is methyl;
Z is methyl or W;
Q is an $NCCH_2{-}$, $NH_2CH_2NHCH_2{-}$, $NC{-}HS{-}$ or $HSCH_2CH_2S{-}$ group;
n is an integer having a value of from 2 to 5;
m is an integer having a value of zero or one;
x is an integer having a value of from 1 to 100; and
y is an integer having a value of from 1 to 100;
wherein the mole ratio of A:B in said coordination complex is from 2:1 to 1:10.

2. A process as claimed in claim 1, wherein silicon compound (B) is a compound of the general formula:

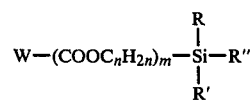

wherein W, R, R,', R" n and m are as defined in claim 1.

3. A process as claimed in claim 1, wherein silicon compound (B) is a compound of the general formula:

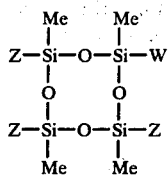

wherein Me, W and Z are as defined in claim 1.

4. A process as claimed in claim 1, wherein silicon compound (B) is a compound of the general formula:

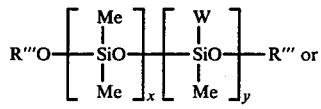

wherein Me, W, R''', x and y are as defined in claim 1.

5. A process as claimed in claim 1 wherein silicon compound (B) is a compound of the general formula:

QCH$_2$CH$_2$SiR$_3$**         (IV)

wherein Q and R** are as defined in claim 1.

6. A process as claimed in claim 1, wherein the silicon compound (B) is diethoxyphosphorylethyl methyl diethoxysilane.

7. A process as claimed in claim 1, wherein the silicon compound (B) is 3-aminopropyl triethoxysilane.

8. A process as claimed in claim 1, wherein the silicon compound (B) is 2-cyanoethyl triethoxysilane.

9. A process as claimed in claim 1, wherein the silicon compound (B) is 2-mercaptoethyl triethoxysilane.

10. A process as claimed in claim 1, wherein said polyesterification catalyst is a coordination complex of monobromo tri(iso-propoxy)titanate and di(isopropoxy)phosphoryl ethyl methyl diethoxysilane.

11. A process as claimed in claim 1, wherein said polyesterification catalyst is a coordination complex of monochloro tri(isopropoxy)titanate and di(isopropoxy)-phosphoryl ethyl methyl diethoxysilane.

12. A process as claimed in claim 1, wherein said polyesterification catalyst is a coordination complex of dichloro(diisopropyl)titanate and di(isopropoxy)phosphoryl ethyl methyl diethoxysilane.

13. A process as claimed in claim 1, wherein said polyesterification catalyst is a coordination complex of monochloro tri(butoxy)-titanate and di(methoxy)phosphoryl ethyl methyl diethoxysilane.

14. A process as claimed in claim 1, wherein said polyesterification catalyst is a coordination complex of monobromo tri(butoxy)titanate and di(methoxy)phosphoryl ethyl methyl diethoxy silane.

15. A process as claimed in claim 1, wherein said polyesterification catalyst is a coordination complex of dichloro diisopropoxy titanate and di(isopropoxy)phosphoryl-ethyl methyl diethoxysilane.

16. A process as claimed in claim 1 wherein said polyesterification catalyst is a coordination complex of tichloro butoxy titanate and di(isopropoxy)phosphoryl-ethyl methyl di(ethoxysilane).

17. A process as claimed in claim 1 wherein said polyesterification catalyst is a coordination complex of dichloro di(isopropoxy)titanate and di(methoxy)phosphoryl ethyl methyl diethoxy silane.

* * * * *